US008643856B2

(12) United States Patent
Nuggehalli et al.

(10) Patent No.: US 8,643,856 B2
(45) Date of Patent: Feb. 4, 2014

(54) METHODS AND SYSTEMS FOR NETWORK PRINTING WITH USER SELECTABLE SETTINGS

(75) Inventors: Jayasimha Nuggehalli, Cupertino, CA (US); Jiang Hong, San Jose, CA (US); Zhenyu Lu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 577 days.

(21) Appl. No.: 12/698,716

(22) Filed: Feb. 2, 2010

(65) Prior Publication Data
US 2011/0188063 A1    Aug. 4, 2011

(51) Int. Cl.
G06F 3/12 (2006.01)
G06K 15/00 (2006.01)
G06K 15/02 (2006.01)
G06F 3/00 (2006.01)
G03G 15/00 (2006.01)

(52) U.S. Cl.
USPC ......... 358/1.13; 358/1.1; 358/1.15; 358/1.16; 358/1.18; 715/762; 715/771; 399/82

(58) Field of Classification Search
USPC .......................... 358/1.13, 1.15, 1.1; 715/744
See application file for complete search history.

(56) References Cited

U.S. PATENT DOCUMENTS

| 5,715,379 | A | * | 2/1998 | Pavlovic et al. | 358/1.13 |
| 5,845,057 | A | * | 12/1998 | Takeda et al. | 358/1.15 |
| 7,777,907 | B2 | * | 8/2010 | Anno et al. | 358/1.15 |
| 7,814,430 | B2 | * | 10/2010 | McComber | 715/771 |
| 8,089,642 | B2 | * | 1/2012 | Taira | 358/1.13 |
| 8,237,940 | B2 | * | 8/2012 | Conescu et al. | 358/1.13 |
| 2002/0109718 | A1 | * | 8/2002 | Mansour et al. | 345/744 |
| 2006/0077119 | A1 | | 4/2006 | Zhang et al. | |
| 2006/0227368 | A1 | * | 10/2006 | Hong | 358/1.15 |
| 2006/0238777 | A1 | * | 10/2006 | Anno et al. | 358/1.1 |
| 2006/0279783 | A1 | * | 12/2006 | Kato | 358/1.18 |
| 2007/0038946 | A1 | | 2/2007 | Grieshaber et al. | |
| 2011/0188063 | A1 | * | 8/2011 | Nuggehalli et al. | 358/1.13 |

FOREIGN PATENT DOCUMENTS

| EP | 1530126 | 5/2005 |
| EP | 1758364 | 2/2007 |
| EP | 2031498 | 3/2009 |
| WO | WO2003067427 A2 | 8/2003 |

* cited by examiner

Primary Examiner — Akwasi M Sarpong
(74) Attorney, Agent, or Firm — Duft, Bornsen & Fettig, LLP

(57) ABSTRACT

Methods and systems for network printing using user selectable printer settings for a variety of configurations of printing systems and finishers. A printing system such as a multi-function printer/device receives user input providing a document identifier (e.g., a release code) identifying a document stored in a network storage server. The printing system also identifies a finisher unit associated with the printing system. The printing system sends the document identifier and a finisher identifier to a print server. The print server determines available printer settings associated with the identified finisher unit and transmits a presentation to the printing system prompting the user to select a desired printer setting. The selected printer settings are transmitted to the print server. The print server retrieves a copy of the identified document and modifies the copy based on the selected printer setting. The modified copy of the document is sent to the printing system to be printed.

17 Claims, 7 Drawing Sheets

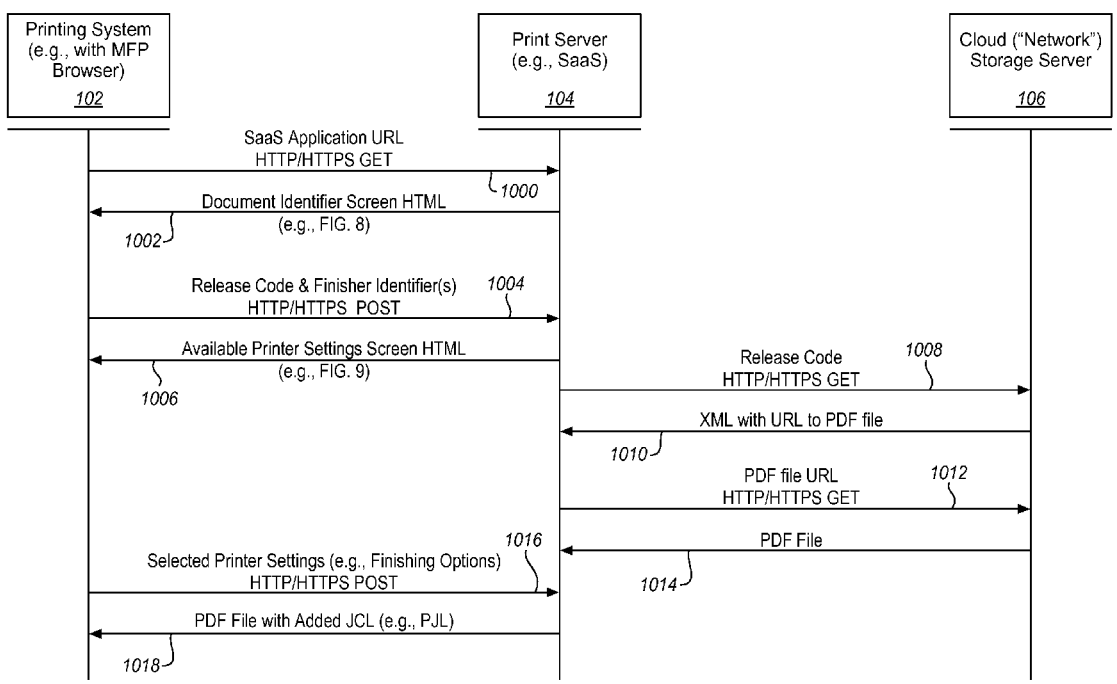

METHODS AND SYSTEMS FOR NETWORK PRINTING WITH USER SELECTABLE SETTINGS

BACKGROUND

1. Field of the Invention

The invention relates generally to network printing (e.g., "cloud printing") and more specifically relates to methods and systems for improved network printing using a printing system (e.g., a multi-function printer, scanner, copier device, etc.) where the network print server enables user selection of printer settings specific to the printing system's present configuration.

2. Discussion of Related Art

"Cloud computing" generally encompasses processing and/or storage of data based on the Internet or based on an enterprise intra-net. For example, cloud computing may encompass the concepts of Software as a Service (SaaS), cloud storage, and cloud printing. SaaS provides an application as a service for a customer to use on demand. Cloud storage generally encompasses the concept of providing/delivering data storage as a service, with the customer being billed for storage usage under a utility computing model (similar to traditional public utilities including electricity). Cloud printing generally encompasses a client process accessing a document from a cloud storage server and causing the document to print. As with cloud storage, a cloud printing user could be charged for the number of pages processed and/or printed. Often the client process in such cloud printing is the printing system itself on which a user interface allows a user to select a document to be retrieved and printed.

Cloud storage servers generally store a document in a generic, portable format—i.e., often in the Portable Document Format (PDF). The PDF format is not intended to be formatted for any particular printing system but rather is intended as just the opposite—a generic format that may be usable on most any printing or display system. Thus, the printing system per se or a print server coupled with the printing system (and coupled with the cloud storage server) must perform any customized formatting or finishing desired by a user when printing a document in a cloud printing environment. Since the processing for customized formatting or finishing may require substantial processing power, it is most common to couple the printing system with a print server that will provide desired formatting (e.g., as a SaaS application).

Where a print server is used to process formatting or finishing options it is a problem for the print server to provide sufficient flexibility to permit a user to fully customize the formatting or finishing options of a document to be printed. Each printing system coupled with the print server may have a particular configuration. Each printing system model may have a different set of printer settings that may be used to control formatting of a document to be printed. Further, each printing system may have one or more optional finisher units coupled with the printing system. Finisher units generally provide post-processing of a printed document and may provide, for example, stapling features, hole-punching features, binding features, folding features, etc. Thus, it is a problem for the print server to enable a user the full flexibility of selecting any document processing/finishing features but also limit the options to only those printer settings actually available on the printing system as presently configured.

Thus, it is an ongoing challenge in cloud printing to provide flexibility in the selection of printer settings in a printing system adapted to provide cloud printing capabilities through use of a print server.

SUMMARY

The present invention solves the above and other problems, thereby advancing the state of the useful arts, by providing methods and systems for flexible definition of available printer settings for a printing system as presently configured for network printing. The printing system and the print server exchange messages to inform the print server of the present configuration of the printing system regarding finisher units. The print server then customizes a user interface presentation (e.g., display screen) to prompt the user to select desired printer settings from among only those printer settings available on the printing system as presently configured. Based on the user's selected printer settings, a requested document is retrieved and modified by the print server to effectuate the user's desired printer settings and to cause the modified document to be printed on the printing system.

One aspect hereof provides a method operable in a printing system for network printing of a document. The method includes selecting a document to be printed. The document is stored in a network storage server coupled with the printing system. The method also includes determining a finisher identifier associated with a finishing unit presently configured with the printing system and transmitting the finisher identifier to the print server. The method then receives from the print server a user interface presentation generated to present available printer settings based on the finisher identifier. The method then presents the user interface presentation to a user of the printing system and receives user input selecting a printer setting for printing the document. The printer setting is selected from the available printer settings presented to the user. The selected printer setting is then transmitted to the print server and a modified document is returned from the print server. The modified document comprising the document modified based on the selected printer setting. The modified document is then printed.

Another aspect hereof provides a method operable in a print server for network printing of a document on a printing system. The method includes receiving from the printing system coupled to the print server a document identifier that identifies the document stored in a network storage server and receiving from the printing system a finisher identifier associated with a finishing unit currently configured with the printing system. The method then generates a user interface presentation that presents available printer settings based on the finisher identifier and transmits the generated user interface presentation to the printing system. The method then receives from the printing system a selected printer setting for printing the document. The printer setting is selected from the available printer settings transmitted to the printing system. The method also includes retrieving a copy of the document from a network storage server based on the document identifier and modifying the retrieved copy of the document based on the selected printer setting. The modified copy of the document is then transmitted to the printing system to be printed by the printing system.

Still another aspect hereof provides a system comprising a printing system. The printing system comprising a printing engine for printing a document and a finishing unit adapted to process printed documents generated by the printing engine. The finishing unit having one or more printer setting associated with controlling its operation. The printing system also includes a user interface device for presenting information to a user and for receiving input from a user and a controller coupled with the printing system and coupled with the finisher unit and coupled with the user interface device. The controller is adapted to control operation of the printing system. The system also includes a print server coupled with the printing system and adapted to couple with a network storage server. The controller is adapted to transmit to the print server a document identifier identifying a document to be printed and is further adapted to transmit to the print server a finisher identifier for the finishing unit. The print server is adapted to transmit to the controller a user interface presentation that presents available printer settings based on the finisher identifier. The controller is further adapted to present the user interface presentation on the user interface device and adapted to receive user input through the user interface device selecting a printer setting from the presented available printer settings. The controller is further adapted to transmit the selected printer setting to the print server and the print server is further adapted to retrieve a copy of the document identified by the document identifier from a network storage server. The print server is further adapted to modify the copy of the document based on the selected printer setting and to transmit the modified copy of the document to the controller. The controller is further adapted to print the modified copy of the document using the printing engine and the finisher unit.

BRIEF DESCRIPTION OF THE DRAWINGS

The same reference number represents the same element or same type of element on all drawings.

FIG. 10 is a message flow diagram describing exemplary messages exchanged between components of the system of FIG. 1 in operating according to the exemplary methods of FIGS. 2 through 7.

DETAILED DESCRIPTION OF THE DRAWINGS

FIGS. 1 through 10 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
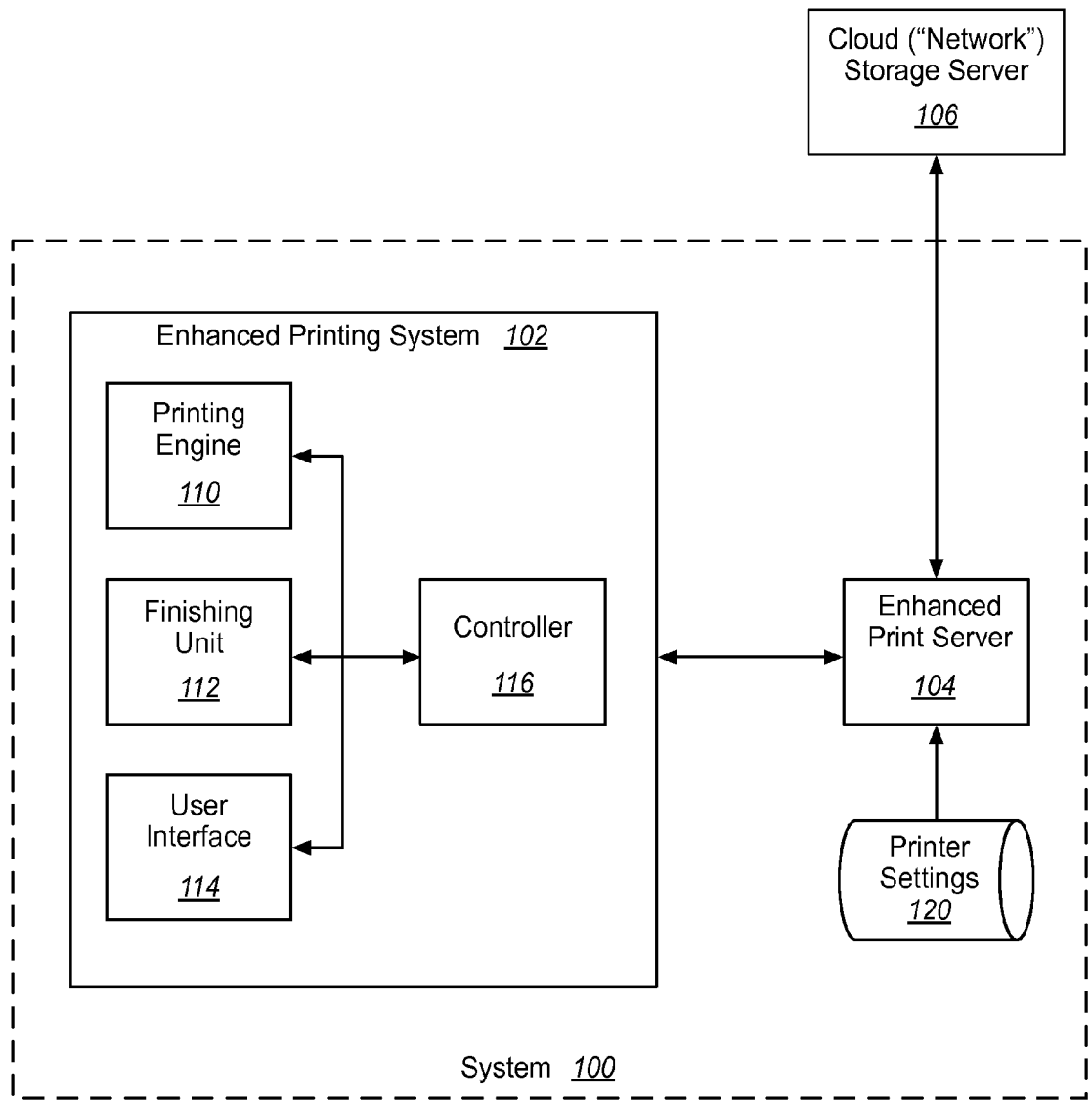
FIG. 1 is a block diagram of an exemplary system including a printing system and a print server enhanced to provide cloud printing services with flexible user specified printer settings in accordance with features and aspects hereof.

FIG. 1 is a block diagram of an exemplary system 100 providing enhanced cloud printing in accordance with features and aspects hereof. System 100 includes enhanced printing system 102. Printing system 102 may be a printer, a multifunction device (e.g., multi-function peripheral or multi-function printer—MFP), or any other device or system adapted for printing documents and/or images on a printable medium such as paper. Printing system 102 includes a printing engine 110 adapted to print documents and/or images on the printable medium. Printing engine 110 (sometimes referred to as a "marking engine") may be an inkjet device, an electrophotographic device (e.g., laser), or any other suitable device for marking images on a printable medium. Printing system 102 also includes finishing unit 112 adapted to receive printed output from printing engine 110 and adapted to provide optional features for finishing of the printed output. Finishing unit 112 may include, for example, stapling features, folding features, binding features, hole-punch features, or any other features and capabilities for finishing processing of a printed document or image. Printing system 102 also includes a user interface 114 adapted to display (e.g., present) user interface presentations and adapted to receive user input. User interface 114 may include, for example, an LCD or other suitable display circuits as well as user input circuits such as a keyboard circuit, a touch screen input circuit, or any other suitable user input circuits.

Printing system 102 also includes controller 116 coupled with printing engine 110, with finishing unit 112, and with user interface 114 to control overall operation of printing system 102. Controller 116 is also adapted to provide communications with external computing systems and servers. Controller 116 may be any suitable electronic or computing device adapted to control overall operation of printing system 102 and further adapted to provide communications with print server 104. Controller 116 may include a general or special purpose processor coupled with suitable memory for storing instructions to be executed as well as associated data. Controller 116 may also include suitable communication interface circuits to couple with printing engine 110, finishing unit 112, user interface 114, and print server 104.

System 100 also includes enhanced print server 104 adapted to provide documents or images to be printed by printing system 102. Print server 104 may be any suitable computing device including personal computers, workstations, and servers. Print server 104 is adapted to generate documents to be printed and further adapted to communicate with printing system 102 (e.g., via controller 116 of printing system 102) to exchange information including, for example, document content to be printed, status information, and commands.

Enhanced print server 104 may be coupled with cloud storage server 106 (i.e., a network storage server) to retrieve copies of documents to be printed by printing system 102. Cloud storage server 106 may be any suitable computing device including personal computers, workstations, and servers. Cloud storage server is adapted to store documents and/or images to be printed. In some embodiments, cloud storage server 106 may be accessed by print server 104 through a public network such as the Internet. In other embodiments, cloud storage server 106 may communicate with print server 104 through an intra-net enterprise network. For example, the storage server may comprise a network-attached storage ("NAS") unit and/or a storage area network ("SAN") unit. Exemplary commercial cloud storage service providers include Amazon S3, Nirvanix, and DocumentMall. Cloud storage server 106 may also comprise part of a photo-sharing web sites such as Picasa Web Albums.

In one exemplary embodiment, system 100 also includes a printer settings memory 120 associated with print server 104. The printer settings memory 120 is adapted to store available printer settings for one or more printing systems and for one or more finisher units. Printer settings memory 120 may be integrated within print server 104 or may be external with respect to print server 104. Printer settings memory 120 may be any suitable memory device including volatile and non-volatile semiconductor memory devices as well as disk storage devices such as magnetic disk storage and/or optical disk storage.

In one exemplary embodiment, print server 104 may provide Software as a Service (SaaS) features in communicating with one or more printing systems 102. Thus, print server 104 may communicate with printing system 102 through a public network such as the Internet or may be a local server communicating with printing system 102 through an intra-net of an enterprise.

In operation of system 100, a user of printing system 102 interacts with controller 116 through user interface 114 to select a document to be printed. Controller 116 also determines one or more finishing unit identifiers each identifying a corresponding finishing unit 112 associated with printing system 102. Since the configuration of printing system 102 may at any given time be configured to include any number and variety of finishing units 112, controller 116 determines the finisher identifier for each finishing unit 112 presently configured for use with printing system 102. Controller 116 communicates with enhanced print server 104 to inform the server of the selected document and the identity of all presently configured finishing units 112. In some embodiments, controller 116 may also communicate with print server 104 to transmit a system model identifier of printing system 102 per se.

Based on information received from printing system 102, enhanced print server 104 generates a user interface presentation (e.g., a display screen) identifying all available printer settings for printing system 102 as presently configured with one or more identified finishing units 112. In some embodiments, the presentation identifying available printer settings may include additional printer settings associated with the system model identifier of printing system 102 per se. The generated user interface presentation is then presented to a user by controller 116 through user interface 114 (e.g., displayed on a display circuit of the interface 114). Controller 116 receives user input through user interface 114 selecting particular printer settings from among the presented available printer settings. Since the server 104 was informed by the printing system 102 of the presently configured finisher units 112, the user interface presentation generated by server 104 presents the user with only those printer settings that may be selected based on the present configuration of the printing system 102. The selected printer settings are those the user desires to be used in printing the selected document. The selected printer settings are then communicated by controller 116 to print server 104.

Print server 104 retrieves a copy of the selected document from cloud storage server 106 and modifies the retrieved copy to add suitable commands to effectuate the user's selected printer settings when printing the selected document on the printing system 102. The modified document including the additional commands is then returned to the printing system 102 from print server 104 and printed under control of controller 116 utilizing print engine 110 and finishing unit 112. The additional commands may be added to the modified document as job control language (JCL) commands including, for example, Printer Job Language (PJL) commands.

In prior printing environment, a print server would require prior knowledge of the specific configuration of each printing system that may ever request a document to be printed. Maintaining such knowledge of the present configuration of each of multiple printing devices is burdensome for the print server and thus inhibits desired flexibility in formatting documents for printing on a particular printing system in its current configuration. By contrast, print server 104 of system 100 obtains present configuration information from each printing system 102 coupled with the server when the printing system requests the document to be printed. Thus, a selected document may be modified according to selected printer settings unique to the current configuration of any particular printing system 102. System 100 therefore allows flexibility in printing a selected document in accordance with particular printer settings available on the printing system 102 as presently configured without the print server 104 requiring particular prior knowledge of the present configuration of each of multiple printing systems 102.

Those of ordinary skill in the art will readily recognize numerous additional and equivalent components in a fully functional system 100. Such additional and equivalent components are omitted herein for simplicity and brevity of this discussion. Thus FIG. 1 is merely intended to suggest one possible embodiment providing the enhanced features and aspects hereof.

Figure 2:
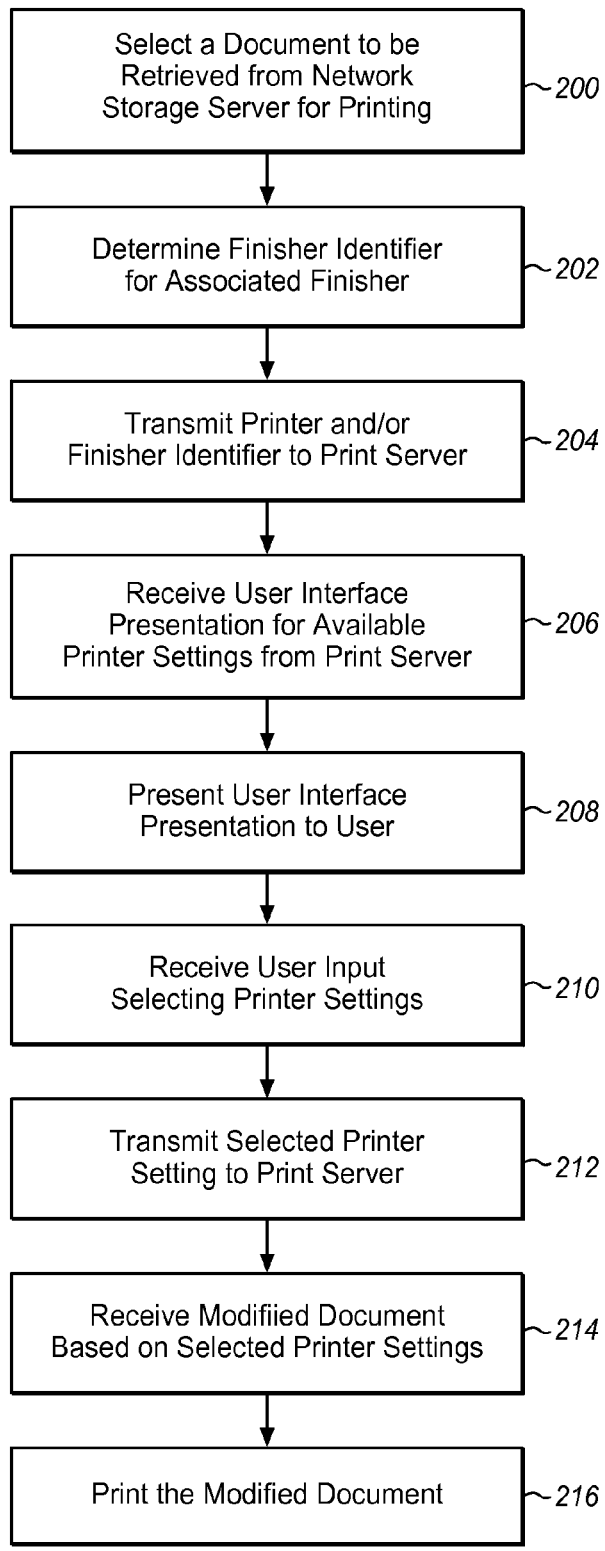
FIGS. 2 through 7 are flowcharts describing exemplary methods for providing flexible user specification of printer settings in a cloud printing environment in accordance with features and aspects hereof.

FIG. 2 is a flowchart describing an exemplary method for providing flexible printer setting selections in printing of a selected document retrieved from a cloud storage server in a cloud printing environment. The method of FIG. 2 describes exemplary operations performed by an enhanced printing system such as printing system 102 of FIG. 1. In particular, the method of FIG. 2 may be performed by controller 116 of printing system 102 of FIG. 1. In step 200 a document is selected to be retrieved from a cloud storage server for purposes of printing the selected document on the printing system. In one exemplary embodiment, a user of the printing system may interact through a user interface to identify a particular document to be selected for printing. At step 202 the printing system determines a finisher identifier for any associated finisher units presently configured for use in the printing system. In one exemplary embodiment, step 202 may also determine a printing system model identifier to identify the printing system per se in which the identified finishing unit is presently configured. In one exemplary embodiment the printer and/or finisher identifier may identify the manufacturer and particular model of the printing system and/or each finisher unit presently configured for use with the printing system.

At step 204 the printing system transmits the printer and/or finisher identifier to a print server coupled with the printing system. In one exemplary embodiment, step 204 may also transmit an identifier of the selected document to the print server. At step 206 the printing system receives from the print server a user interface presentation (e.g., a display screen) indicating all available printer settings. The available printer settings are determined by the print server based on the printer and/or finisher identifier information sent to the print server. Thus, the available printer settings are customized for the particular printing system as presently configured based on the system model identifier and/or finisher identifier transmitted from the printing system to the print server. Step 208 presents the received user interface presentation to a user of the printing system through the user interface of the printing system.

Figure 9:
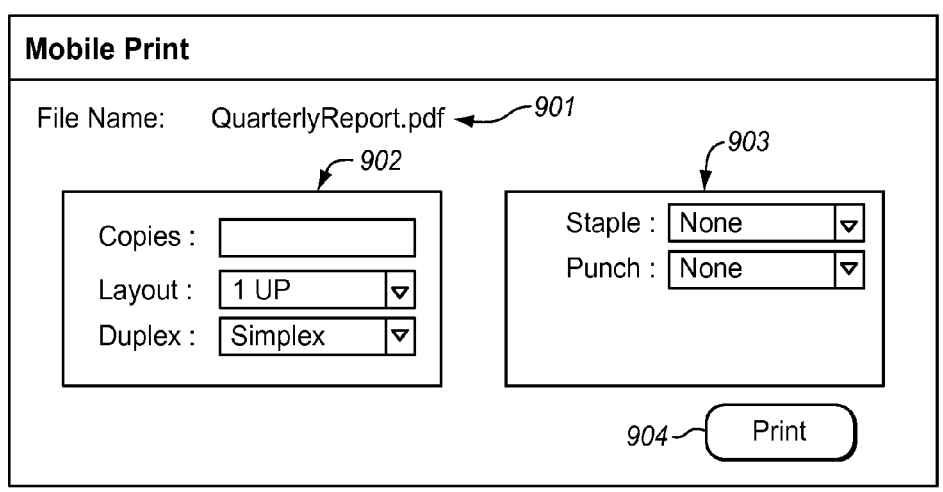

FIG. 9 shows an exemplary display screen 900 presenting a user interface presentation to the user to select desired printer settings from among available printer settings unique to the present configuration of the printing system. The user interface presentation may include an identifier 901 of the document that will be printed. Available printer settings specific to the particular printing system may be included in the user interface presentation as shown in box 902. Exemplary available printer settings specific to the particular printing system model may include, for example: a number of copies, N-up printing features, and duplex printing features. Available printer settings unique to a presently configured finisher unit may be included in the user interface presentation as shown in box 903. Exemplary printer settings for a particular finisher may include, for example: stapling features and hole-punching features. A user selects the desired printer settings from the presented available printer settings and clicks the "Print" button 904 to send the selected printer settings to the print server.

Returning to FIG. 2, at step 210 the printing system receives user input through a user interface of the printing system selecting particular printer settings from among the available printer settings presented to the user. The selected printer settings are then transmitted from the printing system to the print server at step 212. At step 214 the printing system receives from the print server a modified document based on the selected document and the selected printer settings. The modified document is then printed at step 216 to generate the desired output based on the selected document and the selected printer settings.

Figure 3:
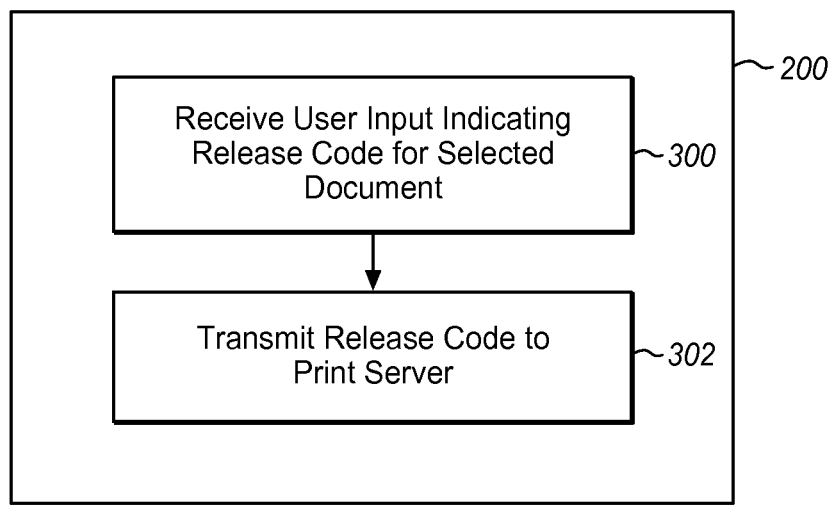

FIG. 3 is a flowchart providing exemplary additional details of processing of step 200 of FIG. 2 to select a document to be retrieved from a cloud storage server for printing. In one exemplary embodiment, the document may be identified by a release code provided by a cloud storage server that stores the document. Most cloud storage servers provide some unique identifier associated with each stored document. Many cloud storage servers use a "release code" to identify each stored document. Step 300 therefore receives user input indicating a release code identifying the document selected for printing. Step 302 then transmits the release code to the print server to permit the print server to retrieve the requested document based on the provided release code. In other exemplary embodiments the document identifier may comprise a Universal Resource Locator (URL). More generally, the document identifier may be any suitable indicia that uniquely identify a document to be retrieved from a cloud storage server.

Figure 8:
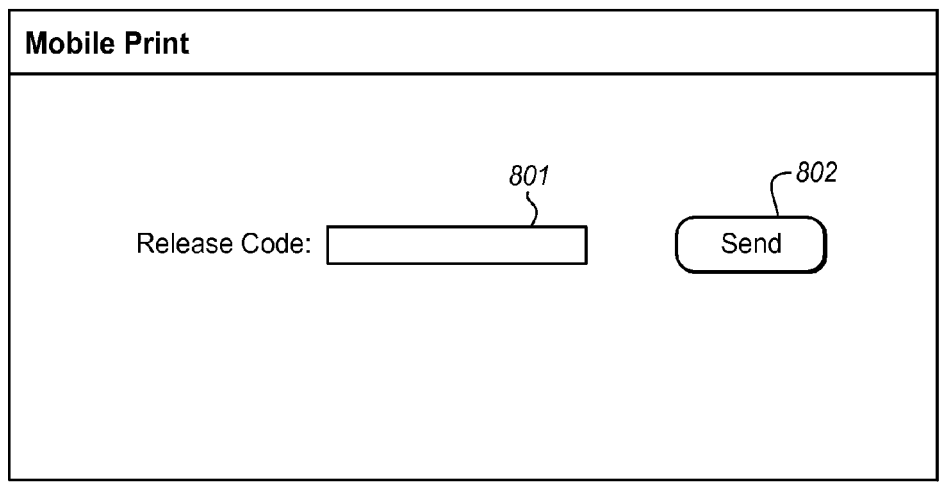
FIGS. 8 and 9 are exemplary screens displayed in conjunction with the methods of FIGS. 2 through 7.

FIG. 8 shows an exemplary display screen 800 presented on the printing system user interface to permit a user to enter a release code. The user enters a release code identifying the document to be printed in window 801 and clicks the "Send" button 802 to transmit that release code to the print server.

Figure 4:
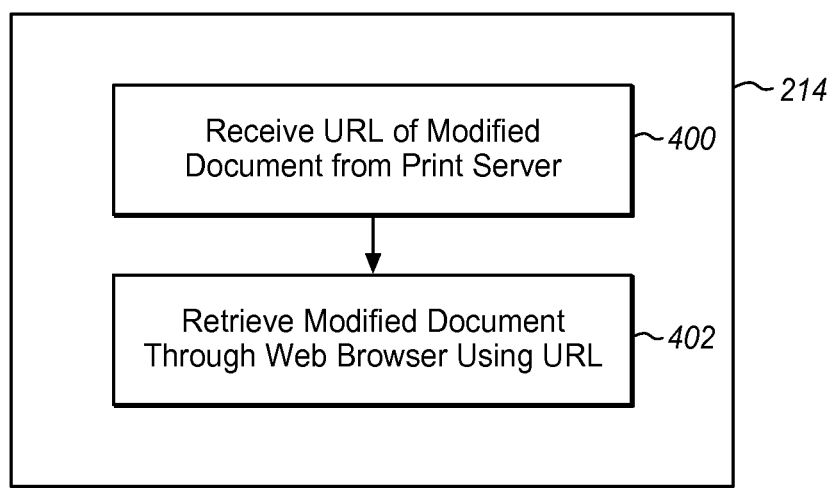

FIG. 4 is a flowchart providing exemplary additional details of the processing of step 214 of FIG. 2 to receive a modified document based on selected printer settings. In general, the print server returns the modified document content to the printing system. In one exemplary embodiment shown in FIG. 4, the printing system at step 400 receives a URL identifying a location of the modified document as stored on the print server or as stored in other suitable storage locations. Using the provided URL, the printing system at step 402 retrieves the modified document utilizing a web browser or other suitable programming within the printing system (e.g., within the printer controller of the printing system) to retrieve the document based on the provided URL.

Figure 5:
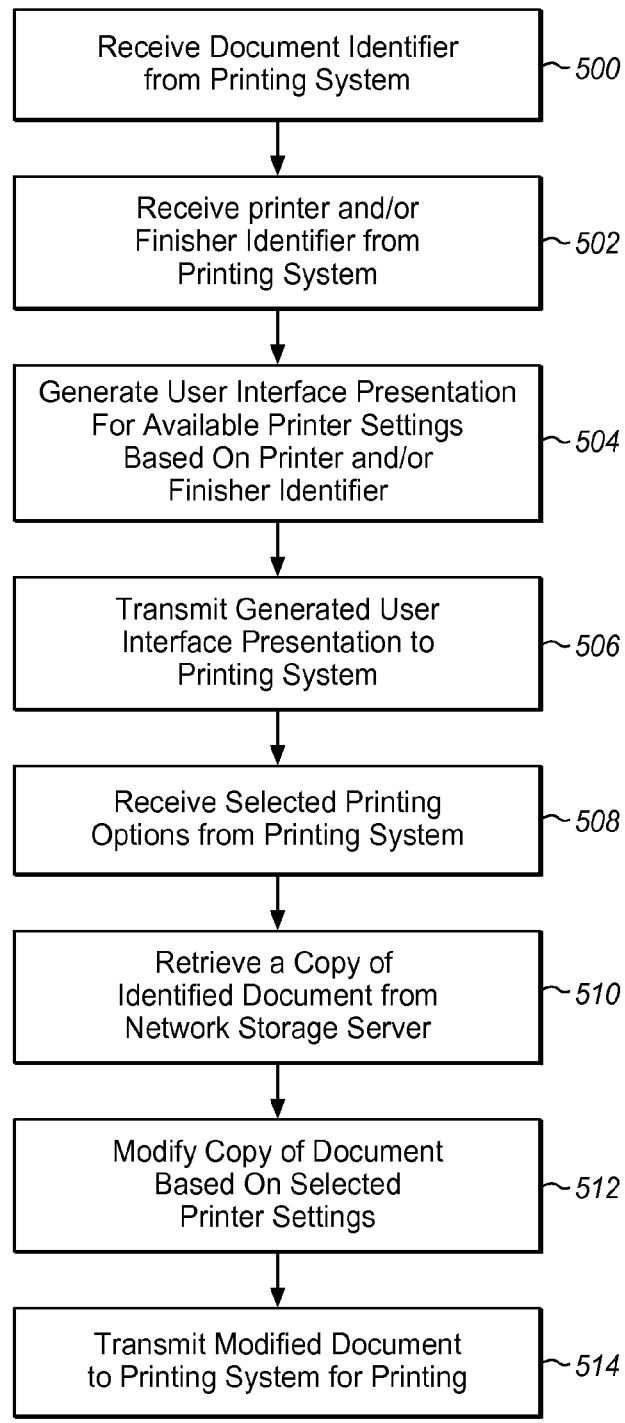

FIG. 5 is a flowchart describing an exemplary method in accordance with features and aspects hereof to modify a copy of a selected document identified by a printing system in accordance with selected printer settings. The method of FIG. 5 may be operable in a system such a system 100 of FIG. 1 and more specifically may be operable in a print server such as print server 104 of FIG. 1. At step 500 the print server receives a document identifier from a printing system coupled with the print server. As noted above, the document identifier may be any suitable indicia that uniquely identify the document selected for printing by the printing system. In one exemplary embodiment, the document identifier may comprise a release code as provided by a cloud storage server.

At step 502, the print server receives a finisher identifier and optionally a printing system model identifier from the printing system indicating the present configuration of the printing system and any finisher units presently configured with the printing system. The printing system model identifier and the finisher identifier may comprise, for example, a manufacturer identifier and a specific model identifier for the printing system and/or for the finisher unit. At step 504 the print server generates a user interface presentation indicating all available printer settings based on the printer and/or finisher identifier received from the printing system. Step 506 then transmits the generated user interface presentation to the printing system for display to a user of the printing system. In one exemplary embodiment, the user interface presentation may be generated as a web page (i.e., encoded as an HTML document) for presentation on the printing system via a web browser incorporated within the printing system. Step 508 then receives selected printer settings from the printing system. As noted above, a user of the printing system, in response to display of available printer settings from the user interface presentation, selects desired printer settings and the printing system returns the selected settings to the print server.

At step 510 the print server retrieves a copy of the identified, selected document from a cloud storage server coupled with the print server. A copy is retrieved by supplying the document identifier (e.g., release code) received from the printing system to the cloud storage server. In one exemplary embodiment, the cloud storage server and print server may interact utilizing HTTP protocols and HTML encoded exchanges. In other exemplary embodiments, the cloud storage server and print server may interact utilizing XML messaging. In general, the print server interaction with the cloud storage server is in accordance with the documented protocols and messages defined by the particular cloud storage server third-party provider.

At step 512 the print server modifies the retrieved copy of the selected document based on the selected printer settings. The modified copy of the document is then transmitted to the printing system to generate the printed output for the requesting user. As noted above, in one exemplary embodiment the modified document content, per se, may be directly transmitted to the printing system to be printed. In another exemplary embodiment a URL or other suitable locator indicia may be transmitted to the printing system to identify a location of the modified copy of the document such that the printing system may then retrieve the modified document for eventual printing.

Figure 6:
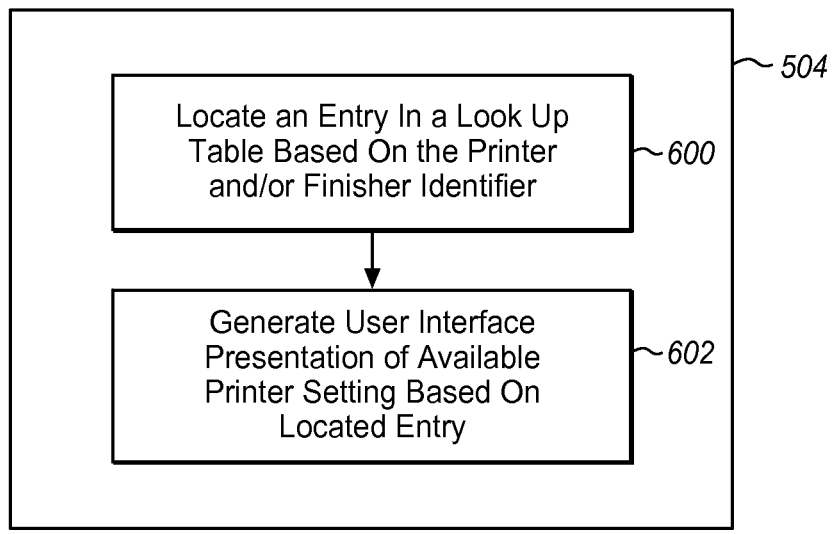

FIG. 6 is a flowchart describing exemplary additional details of the processing of step 504 of FIG. 5 to generate a user interface presentation of the available printer settings. At step 600 the print server locates an entry in a lookup table stored in a memory associated with the print server. An entry is located based on the received printing system model identifier and/or based on the finisher identifier. In one exemplary embodiment the printing system may provide only a finisher identifier used for locating an entry in the lookup table. In other embodiments, the printing system may provide both a printing system model identifier and a finisher identifier for each of one or more finisher units presently configured with the printing system. For each such identifier received from the printing system, an entry may be located in the lookup table to determine all available printer settings for the printing system as presently configured with one or more finisher units. Step 602 then generates a user interface presentation of all available printer settings based on one or more such located entries in the lookup table. As noted above, the user interface presentation may be encoded as an HTML web page to be presented to a user by use of a web browser integrated within the printing system.

Figure 7:
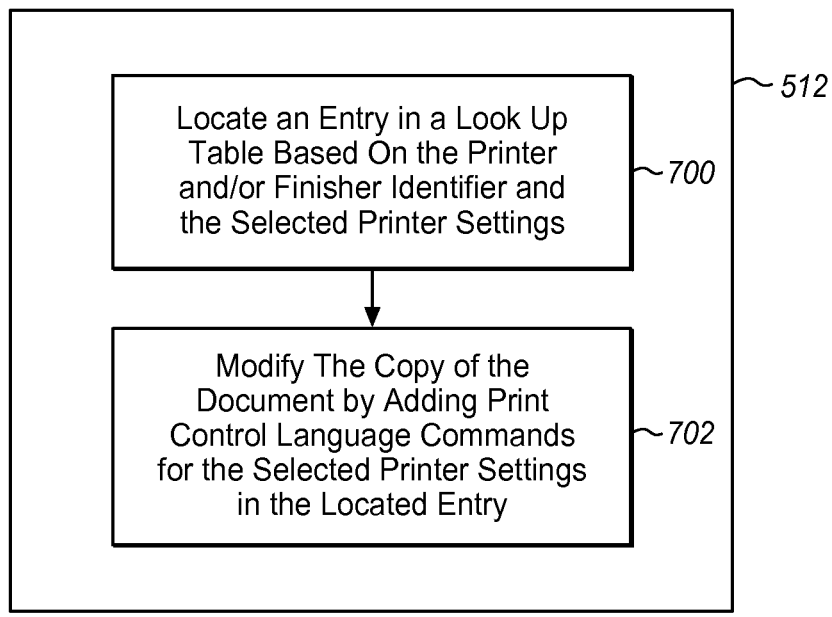

FIG. 7 is a flowchart describing exemplary additional details of the processing of step 512 of FIG. 5 to generate a modified copy of a selected document based on user selected printer settings. At step 700 the print server locates an entry in the lookup table based on the received printing system model identifier and/or the finisher identifier and based on the selected printer settings from the user of the printing system. The located entry contains information defining commands to be executed by the printing system and/or finisher unit to effectuate the user's selected printer settings. The commands may be encoded in the located entry as JCL commands and in one exemplary embodiment may be encoded as PJL commands. Step 702 generates the modified copy of the document by adding to the retrieved copy of the document the commands encoded in the located entry/entries from the lookup table. The modified copy of the document with added printer setting commands is then transmitted to the printing system for printing as discussed above in FIG. 5.

Those of ordinary skill in the art will readily recognize numerous additional and equivalent steps in methods operable in a system such as system 100 of FIG. 1. Such additional and equivalent components are omitted herein for simplicity and brevity of this discussion. Thus, FIGS. 2 through 7 are merely intended to suggest possible embodiments of methods providing the enhanced features and aspects hereof.

A lookup table as discussed above may be encoded in the printer server as any suitable data structure that associates:
  one or more finisher identifiers (and optionally one or more printing system model identifiers) with one or more corresponding available feature names;
  associates each such feature name with one or more feature setting names; and
  associates each such feature setting name with a printer setting command string to effectuate the corresponding feature setting.

Table 1 below is exemplary of such a table that may be implemented in any suitable data structure, file, or database. The entries of Table 1 associate each feature setting name with a corresponding PJL command string to effectuate a corresponding printer setting.

print server 104, and the rightmost vertical bar represents messages sent and received by cloud storage server 106.

Arrow 1000 represents an HTTP GET message directed from the printing system 102 to the print server 104 requesting access to the SaaS cloud printing application. As noted above, the cloud printing services enhanced in accordance with features and aspects hereof may be provided as a SaaS application from the print server 104. Responsive to the HTTP GET, arrow 1002 represents a return message from the print server 104 to the printing system 102 initiating operation of the cloud printing SaaS application. In one exemplary embodiment the document identification screen discussed above with respect to FIG. 8 may be provided in message 1002 encoded as an HTML screen to be presented by a web browser operating within printing system 102.

Responsive to user input provided in the document identifier screen, message 1004 is directed from the printing system to the print server as an HTTP POST. The POST message may include the release code entered in the document identifier screen as well as one or more finisher identifiers identifying finisher units presently configured with the printing system. In addition, as noted above, the POST message may include a printing system model identifier identifying the base model of the printing system per se. Those of ordinary skill in the art will readily recognize that the release code (e.g., document identifier), the finisher identifier, and a printing system model identifier (if any) may all be transmitted in a single HTTP POST message or in multiple such messages.

Responsive to the POST message 1004, print server 104 returns message 1006 to printing system 102. Message 1006 may include a user interface presentation indicating all available printer settings determined based on the provided one or more finisher identifiers and any provided printing system model identifier received in message 1004. In one exemplary embodiment the available printer settings may be encoded as an HTML web page as depicted and described above with respect to FIG. 9.

At any time after the print server 104 has received the release code (e.g., document identifier) it may transmit an HTTP GET message 1008 to the cloud storage server 106 supplying the release code to identify the requested document. Responsive to this GET message, cloud server 106 may return an XML message 1010 providing a URL identifying a

TABLE 1

| Finisher Identifier | Feature Name | Feature Setting Name | Printer Setting PJL Commands |
|---|---|---|---|
| Finisher 1000 | Staple | Left Slant | @PJL SET STAPLE=LEFTTOPSLANT |
|  |  | Right Slant | @PJL SET STAPLE=RIGHTTOPSLANT |
|  |  | Left 2 | @PJL SET STAPLE=LEFT2 |
|  |  | Right 2 | @PJL SET STAPLE=RIGHT2 |
|  |  | Top 2 | @PJL SET STAPLE=TOP2 |
|  | Punch | Left | @PJL SET PUNCH=LEFT |
|  |  | Right | @PJL SET PUNCH=RIGHT |
|  |  | Top | @PJL SET PUNCH=TOP |
| Finisher BK3000 | Staple | Booklet | @PJL SET STAPLE=BOOKLET |
| Duplex Unit 100 | Duplex | Off | @PJL SET DUPLEX=OFF |
|  |  | On | @PJL SET DUPLEX=ON |

FIG. 10 is a message flow diagram describing exemplary exchanges between the printing system 102, the print server 104, and the cloud storage server 106 as depicted in system 100 of FIG. 1. Vertical bars of FIG. 10 represent each of the devices shown in FIG. 1. The leftmost vertical bar represents messages sent and received by printing system 102. The middle vertical bar represents messages sent and received by location in the cloud storage server at which the corresponding document may be retrieved. In many commercially available cloud storage servers, documents are stored as PDF (portable document format) files pointed to by the provided URL. At any time after print server 104 receives message 1010, print server 104 may transmit an HTTP GET message 1012 to the cloud storage server 106 to retrieve the a copy of the PDF file identified by the URL in message 1010. Message 1014 represents return of the requested PDF file from the cloud storage server 106 to the print server 104. In general, messages 1008, 1010, 1012, and 1014 exchange information, and are encoded, in accordance with the requirements of the particular commercial cloud storage server provided by a third-party vendor as specified by the cloud storage service within an enterprise intra-net.

Message 1016 is sent from printing system 102 to print server 104 in response to the user providing input responsive to the user interface presentation of all available printer settings. Message 1016 may be an HTTP POST message providing the user's selected printer settings. Responsive to receipt of message 1016, print server 104 modifies the PDF file retrieved in message 1014 by adding suitable job control commands to the PDF file. The added commands effectuate the users selected printer settings. As noted above, processing of the print server generating a modified copy of the document may entail looking up the provided finisher identifier in a lookup table or database to locate corresponding JCL command strings (e.g., PJL) for inclusion in the modified copy of the document.

Responsive to receipt of message 1016, and responsive to completion of the modifications to the copy of the document, print server 104 returns message 1018 to printing system 102. Message 1018 may include the content of the modified copy of the document. As noted above, in alternative embodiments, message 1018 may merely identify a location of the modified copy of the document within print server 104 (e.g., by providing a URL). In these alternative embodiments, further message exchanges will be readily apparent to those of ordinary skill in the art to request the identified modified copy of the document (e.g., another HTTP GET message) followed by return of the content of the modified copy of the document from print server 104 to printing system 102.

Those of ordinary skill in the art will readily recognize numerous additional and equivalent message flows that may be utilized to implement features and aspects hereof. Thus, the message exchange of FIG. 10 is intended merely as one exemplary embodiment of a sequence of message exchanges in a system such as system 100 of FIG. 1.

Those of ordinary skill in the art will further readily recognize numerous standard programming and interface techniques to obtain information from the printing system regarding its present configuration—information such as a printing system model identifier and finisher identifiers for any finisher units presently configured with the printing system.

Some controllers of printing systems (e.g., controllers of multi-function printers) are essentially fully functional computing devices that include an object-oriented operating system that, in turn, provides a number of standard object access methods for additional programming features to access printing system information. For example, the operating system of the MFP controller may provide a programming interface (i.e., an application programming interface or API) implementing a Java or JavaScript API. One exemplary API may provide an interface such as described by the following Table 2

TABLE 2

| Object | Method | Parameter | Return Value | Description |
| --- | --- | --- | --- | --- |
| System.MultiFunction | GetFinisherList( ) | | Array | Returns Installed Finishing Units name as array |
| System.MultiFunction | GetDuplexUnit( ) | | Boolean | Returns True: Duplex Installed False: Duplex No Installed |
| System.MultiFunction | doDownload( ) | Char * | | Downloads as Print Data from a file by specifying a URL parameter for the file |
| System.MultiFunction | doPrint( ) | | | Downloaded Print Data is printed |

Although specific embodiments were described herein, the scope of the invention is not limited to those specific embodiments. The scope of the invention is defined by the following claims and any equivalents thereof.

We claim:

1. A method operable in a printer for network printing of a document, the method comprising:
    selecting, by a user of the printer, a document to be printed, wherein the document is stored in a network storage server coupled with the printer;
    determining, by the printer, a finisher identifier associated with a finishing unit presently configured at the printer;
    transmitting, by the printer, the finisher identifier to a print server;
    receiving, by the printer from the print server, a user interface presentation generated to present available finishing options at the printer based on the finisher identifier;
    presenting, by the printer, the user interface presentation to the user;
    receiving, by the printer, input at the user interface presentation selecting a finishing option for the document;
    transmitting, by the printer, the selected finishing option to the print server;
    receiving, by the printer from the print server, a modified document based on a Job Control Language (JCL) command for performing the selected finishing option for the document;
    printing, by the printer, the modified document; and
    performing, by the finishing unit at the printer, the selected finishing option for the modified document based on the JCL command.

2. The method of claim 1 further comprising:
    wherein the step of selecting the document further comprises:
        receiving user input identifying a release code associated with the selected document; and transmitting the release code to the print server to identify the selected document to the print server.

3. The method of claim 1 further comprising:
determining, by the printer, a system model identifier associated with the printer; and
transmitting, by the printer, the system model identifier to the print server, wherein the available finishing options are based on the finisher identifier and the system model identifier.

4. The method of claim 1:
wherein the step of receiving the modified document further comprises:
receiving from the print server a modified document universal resource locator (URL) indicating a location of the modified document; and
retrieving the modified document based on the received URL.

5. The method of claim 4:
wherein the printer includes a web browser,
wherein the step of retrieving the modified document further comprises:
retrieving the modified document by operation of the web browser based on the URL,
wherein the user interface presentation is a web page,
wherein the step of receiving the user interface presentation further comprises:
receiving the web page in the web browser, and
wherein the step of presenting the user interface presentation further comprises:
presenting the web page by operation of the web browser.

6. The method of claim 1:
wherein the JCL command is at least one Printer Job Language (PJL) command.

7. A method operable in a print server for network printing of a document on a printer, the method comprising:
receiving by the print server from the printer, a document identifier identifying the document stored in a network storage server;
receiving, by the print server from the printer, a finisher identifier associated with a finishing unit currently configured at the printer;
generating, by the print server, a user interface presentation based on the finisher identifier to present available finishing options at the printer to a user of the printer;
transmitting, by the print server, the generated user interface presentation to the printer;
receiving, by the print server from the printer, a selected finishing option for the document, the finishing option selected from the available finishing options available in the user interface presentation;
retrieving, by the print server, a copy of the document from the network storage server based on the document identifier;
modifying, by the print server, the retrieved copy of the document based on a Job Control Language (JCL) command for performing the selected finishing option; and
transmitting, by the print server to the printer, the modified copy of the document for printing of the modified copy of the document by the printer and for performing the selected finishing option for the modified document by the finishing unit at the printer based on the JCL command.

8. The method of claim 7:
wherein the step of generating the user interface presentation further comprises:
locating, in a lookup table stored in a memory associated with the print server, an entry associated with the received finisher identifier, the record comprising available finishing options for a finisher unit identified by the finisher identifier; and
generating the user interface presentation based on the available finishing options in the located entry.

9. The method of claim 7 further comprising:
receiving, by the print server from the printer, a system model identifier associated with the printer,
wherein the step of generating the user interface presentation further comprises:
generating the user interface presentation based on the finisher identifier and based on the system model identifier.

10. The method of claim 7:
wherein the step of generating the user interface presentation further comprises:
generating the user interface presentation as a web page.

11. The method of claim 7:
wherein the JCL command is at least one Printer Job Language (PJL) command.

12. The method of claim 7:
wherein the document identifier comprises a release code.

13. A system comprising:
a print server; and
a printer comprising:
a printing engine for printing a document;
a finishing unit adapted to process printed documents generated by the printing engine, the finishing unit accepting one or more Job Control Language (JCL) commands for performing finishing operations;
a user interface device for presenting information to a user and for receiving input from the user; and
a controller adapted to control operation of the printing system,
wherein the controller is adapted to transmit to the print server a document identifier identifying a document to be printed, and to transmit to the print server a finisher identifier for the finishing unit,
wherein the print server is adapted to generate a user interface presentation of available finishing options for the printer based on the finisher identifier, and to transmit the user interface presentation to the printer,
wherein the controller is further adapted to present the user interface presentation on the user interface device, to receive user input through the user interface device selecting a finishing option, and to transmit the selected finishing option to the print server,
wherein the print server is further adapted to retrieve a copy of the document identified by the document identifier from a network storage server, to modify the copy of the document based on a JCL command for performing the selected finishing option, and to transmit the modified copy of the document to the controller,
wherein the controller further adapted to print the modified copy of the document using the printing engine, and to perform the selected finishing option using the finishing unit based on the JCL command.

14. The system of claim 13 further comprising:
a memory coupled with the print server, the memory adapted to store available JCL commands accepted by one or more finisher units, wherein the print server is further adapted to locate an entry in the memory based on the finisher identifier wherein the located entry indicates the available JCL commands accepted by the finishing unit of the printer for performing finishing options by the finishing unit.

15. The system of claim 14:
wherein the controller is further adapted to determine a system model identifier associated with the printer and further adapted to transmit the system model identifier to the print server, the memory is further adapted to store available printer settings provided by one or more printers, and the print server is further adapted to locate an entry in the memory based on the system model identifier wherein the located entry indicates the available printer settings for the printer.

16. The system of claim 13:
wherein the controller is further adapted to modify the copy of the document by adding JCL commands based on the selected finishing option.

17. The system of claim 16:
wherein the JCL commands are Printer Job Language (PJL) commands.

* * * * *